(12) United States Patent
Lin

(10) Patent No.: US 11,870,637 B2
(45) Date of Patent: *Jan. 9, 2024

(54) BEAM FAILURE RECOVERY WITH SECONDARY CELLS

(71) Applicant: MEDIATEK INC., Hsin-Chu (TW)

(72) Inventor: Hsuan-Li Lin, Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/856,308

(22) Filed: Jul. 1, 2022

(65) Prior Publication Data

US 2022/0337473 A1 Oct. 20, 2022

Related U.S. Application Data

(63) Continuation of application No. 17/064,893, filed on Oct. 7, 2020, now Pat. No. 11,411,806.

(60) Provisional application No. 62/931,887, filed on Nov. 7, 2019.

(51) Int. Cl.
| | |
|---|---|
| *H04L 41/0654* | (2022.01) |
| *H04W 76/15* | (2018.01) |
| *H04B 7/06* | (2006.01) |
| *H04W 24/08* | (2009.01) |
| *H04W 74/08* | (2009.01) |
| *H04W 88/06* | (2009.01) |

(52) U.S. Cl.
CPC ....... *H04L 41/0654* (2013.01); *H04B 7/0617* (2013.01); *H04W 24/08* (2013.01); *H04W 74/0833* (2013.01); *H04W 76/15* (2018.02); *H04W 88/06* (2013.01)

(58) Field of Classification Search
CPC ..... H04L 41/0654; H04L 5/001; H04L 5/003; H04B 7/0617; H04B 7/0695; H04W 24/08; H04W 74/0833; H04W 76/15; H04W 88/06
See application file for complete search history.

(56) References Cited

U.S. PATENT DOCUMENTS

| | | | | |
|---|---|---|---|---|
| 2019/0306842 | A1* | 10/2019 | Cirik | H04B 7/0695 |
| 2020/0052769 | A1* | 2/2020 | Cirik | H04L 1/0026 |
| 2020/0313833 | A1* | 10/2020 | Yi | H04L 5/001 |
| 2021/0377852 | A1* | 12/2021 | Zhou | H04W 24/10 |

\* cited by examiner

*Primary Examiner* — Habte Mered
(74) *Attorney, Agent, or Firm* — Zheng Jin; Helen Mao; Imperium Patent Works

(57) ABSTRACT

A method of performing beam failure recovery (BFR) procedure in primary cell and secondary cells with reduced UE complexity is proposed. A UE is configured to operate in one or multiple frequency bands under carrier aggregation or dual connectivity. The UE performs beam failure recovery (BFR) procedure on one serving cell for one frequency band across FR1 and FR2. The serving cell is an active serving cell including both primary cell (PCell) and secondary cells (SCells). Specifically, for SCell BFR procedure, a sharing factor K is introduced when multiple SCells are configured to perform BFR procedure. In one embodiment, the SCell BFR evaluation period equals to a predefined PCell BFR evaluation period times the sharing factor K.

20 Claims, 4 Drawing Sheets

| Configuration | $T_{Evaluate\_BFD\_SSB}$ (ms) |
|---|---|
| no DRX | $Max([50], Ceil(5*P)*T_{SSB})*K\_BFD$ |
| DRX cycle ≤ 320ms | $Max([50], Ceil(7.5*P)*Max(T_{DRX}, T_{SSB}))*K\_BFD$ |
| DRX cycle > 320ms | $K\_BFD*Ceil(5*P)*T_{DRX}$ |
| Note: $T_{SSB}$ $T_{DRX}$ | The periodicity of SSB in the set. The DRX cycle length. |

BFD/CBD Evaluation period for Pcell or PSCell 400

| SCENARIOS | | FR1 | FR2-BAND #21 | FR2-BAND #22 | FR2-BAND #23 | SHARING FACTOR K |
|---|---|---|---|---|---|---|
| EN-DC | #1 | PCell | PSCell SCell #2 | SCell #1 | N.A. | K=1 |
| | #2 | PCell | PSCell SCell #3 | SCell #1 SCell #2 | N.A. | K=1 |
| | #3 | PCell | PSCell | SCell #1 | SCell #2 | K=2 |
| FR2 CA | #4 | N.A. | PCell | SCell | N.A. | K=1 |
| | #5 | N.A | PCell | SCell #1 | SCell #2 | K=2 |
| FR1-FR2 CA | #6 | PCell | SCell #1 | Scell #2 Scell #3 | N.A. | K=2 |
| | #7 | PCell | SCell #1 | SCell #2 | SCell #3 | K=3 |

FIG. 5

| SCENARIOS | | FR1-BAND #11 | FR1-BAND #21 | FR2-BAND #21 | FR2-BAND #22 | SHARING FACTOR K |
|---|---|---|---|---|---|---|
| EN-DC | #1 | PCell | SCell #1 | PSCell | N.A | K=1 |
| | #2 | PCell | SCell #1 | PSCell | Scell #2 | K=2 |
| | #3 | PCell | SCell #1 | PSCell SCell #2 | SCell #3 | K=2 |
| FR1-FR2 CA | #4 | PCell | SCell #1 | SCell #2 SCell #3 | N.A. | K=2 |
| | #5 | PCell | SCell #1 | SCell #2 | SCell #3 | K=3 |

FIG. 6

BEAM FAILURE RECOVERY WITH SECONDARY CELLS

CROSS REFERENCE TO RELATED APPLICATIONS

This application is a continuation, and claims priority under 35 U.S.C. § 120 from nonprovisional U.S. patent application Ser. No. 17/064,893, entitled "BEAM FAILURE RECOVERY WITH SECONDARY CELLS", filed on Oct. 7, 2020, the subject matter of which is incorporated herein by reference. Application Ser. No. 17/064,893, in turn, claims priority under 35 U.S.C. § 119 from U.S. Provisional Application No. 62/931,887, entitled "Beam Failure Recovery with SCells," filed on Nov. 7, 2019, the subject matter of which is incorporated herein by reference.

TECHNICAL FIELD

The disclosed embodiments relate generally to wireless communication, and, more particularly, to beam failure recovery procedure involving both primary cell and secondary cells in new radio (NR) mobile communication networks.

BACKGROUND

The bandwidth shortage increasingly experienced by mobile carriers has motivated the exploration of the under-utilized Millimeter Wave (mmWave) frequency spectrum between around 30 G and 300 G Hz for the next generation broadband cellular communication networks. The available spectrum of mmWave band is hundreds of times greater than the conventional cellular system. The mmWave wireless network uses directional communications with narrow beams and can support multi-gigabit data rate. The under-utilized bandwidth of the mmWave spectrum has very small wavelengths, which enables large number of miniaturized antennas to be placed in a small area. Such miniaturized antenna system can produce high beamforming gains through electrically steerable arrays generating directional transmissions. With recent advances in mmWave semiconductor circuitry, mmWave wireless system has become a promising solution for real implementation. However, the heavy reliance on directional transmissions and the vulnerability of the propagation environment present particular challenges for the mmWave network with beamforming.

In principle, beam management and beam training mechanism, which includes both initial beam alignment and subsequent beam tracking, ensures that base station (BS) beam and user equipment (UE) beam are aligned for data communication. To ensure beam alignment, beam-tracking operation should be adapted in response to channel changes. Beam failure recovery mechanism is designed to handle the rare case beam tracking issue, e.g., when feedback rate for beam management and beam training may not be frequent enough. When beam failure is detected, UE triggers a beam failure recovery procedure and identifies a candidate beam for beam failure recovery (BFR). UE then starts beam failure recovery request (BFRQ) transmission on physical random-access channel (PRACH) resource corresponding to the identified candidate beam.

Under E-UTRAN New Radio Dual-Connectivity (EN-DC), a UE communicates with its serving base stations over different radio access technology (RAT) and frequency bands in primary cell (PCell), primary secondary cell (PSCell), and secondary cells (SCells) simultaneously. Under carrier aggregation (CA), a UE communicates with its serving base station over aggregated frequency bands in PCell and SCells simultaneously. Typically, the BFR procedure is supported in primary cell (PCell) and primary secondary cell (PSCell), but not in secondary cells (SCells). It is necessary for UE to perform BFR in SCells so that beam failures occurred in secondary cells can also be detected and recovered. However, if UE is required to perform BFR on more than one serving cells for each frequency band, it is assumed that UE performance cannot be guaranteed. A solution is sought for UE performing BFR procedures in secondary cells with reduced UE complexity.

SUMMARY

A method of performing beam failure recovery (BFR) procedure in primary cell and secondary cells with reduced UE complexity is proposed. A UE is configured to operate in one or multiple FR bands under carrier aggregation or dual connectivity. The UE performs beam failure recovery (BFR) procedure on one serving cell for one FR band across FR1 and FR2. The serving cell is an active serving cell including both primary and secondary cells. Specifically, for secondary serving cell BFR procedure, a sharing factor K is introduced when multiple SCells are configured to perform BFR procedure. In one embodiment, the sharing factor K can be determined based on the number of FR bands that SCells on which UE is configured to perform BFR, excluding the FR bands with PCell and PSCell, across both FR1 and FR2 bands. For SCell BFR, the evaluation period equals to a predefined PCell BFR evaluation period times the sharing factor K.

In one embodiment, a UE establishes multiple connections in a primary cell and one or more secondary cells in a beamforming communication network. The UE is configured to operate under one or multiple frequency bands with carrier aggregation or dual connectivity. The UE determines a number of frequency bands that the UE is configured to perform beam failure recovery (BFR). The UE also determines a sharing factor based on the number of frequency bands. The UE performs BFR on the primary cell using a first evaluation period and on a number of selected secondary cells using a second evaluation period. The second evaluation period equals to the first evaluation period times the sharing factor. In one embodiment, the sharing factor is equal to the number of the selected secondary cells, which is also equal to the number of frequency bands excluding any frequency band with the primary cell or a primary secondary cell under carrier aggregation or dual connectivity.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 illustrates one scenario of determining a sharing factor K for a BFR procedure with secondary cells in accordance with one novel aspect.

FIG. 6 illustrates another scenario of determining a sharing factor K for a BFR procedure with secondary cells in accordance with one novel aspect.

DETAILED DESCRIPTION

Reference will now be made in detail to some embodiments of the invention, examples of which are illustrated in the accompanying drawings.

Figure 1:
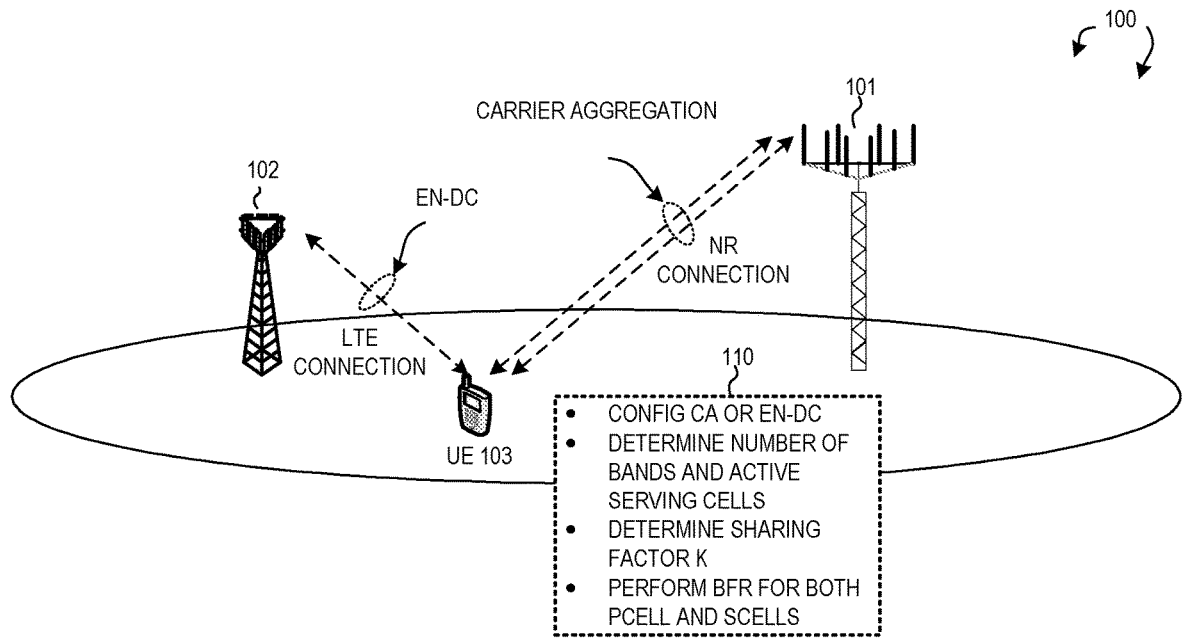
FIG. 1 illustrates an LTE and NR beamforming wireless communication system and supporting beam failure recovery (BFR) procedure for both primary cell and secondary cells with a sharing factor under carrier aggregation or dual connectivity in accordance with one novel aspect.

FIG. 1 illustrates an LTE and NR beamforming wireless communication system 100 and supporting beam failure recovery (BFR) procedure for both primary cell and secondary cells with a sharing factor under carrier aggregation or dual connectivity in accordance with one novel aspect. Mobile communication network 100 comprises a base station BS 101, BS 102, and a user equipment UE 103. In next generation 5G NR systems, a base station (BS) is referred to as gNB. The base station performs beamforming in NR, e.g., in both FR1 (sub7 GHz spectrum) or FR2 (Millimeter Wave frequency spectrum). The NR beamforming cellular network uses directional communications with beamformed transmission and can support up to multi-gigabit data rate. Directional communications are achieved via digital and/or analog beamforming, wherein multiple antenna elements are applied with multiple sets of beamforming weights to form multiple beams.

The concept of carrier aggregation (CA) has been introduced to enhance the system throughput. With CA, two or more component carriers (CCs) are aggregated to support wider transmission bandwidth up to 100 MHz. The demand for higher bandwidth may require exploiting further on CA operation to aggregate cells from different base stations to serve a single UE, called inter-base station carrier aggregation (inter-eNB CA). For UEs with more than one RF transceiver modules, UE can be simultaneously connected to a master node (MN) and a secondary node (SN) under DuCo or DC (dual connectivity). Multiple serving cells are configured for the UE in DC mode. The serving cell from the MN is defined as Master Cell Group (MCG). The subset of serving cells that do not belong to MCG is defined as Secondary Cell Group (SCG). For example, under EN-DC, LTE cells become an MCG and NR cells become an SCG. There is one primary cell (PCell) in MCG and one primary secondary cell (PSCell) in SCG.

In beamforming network, beam management and beam training mechanism, which includes both initial beam alignment and subsequent beam tracking, ensures that base station (BS) beam and user equipment (UE) beam are aligned for data communication. To ensure beam alignment, beam-tracking operation should be adapted in response to channel changes. A beam failure recovery (BFR) mechanism is designed to handle the rare case beam tracking issue, e.g., when feedback rate for beam management and beam training may not be frequent enough. When beam failure on all serving links for control channels, UE identifies one or more new candidate beams for beam failure recovery. Note that beam failure detection (BFD) and new candidate beam identification (CBD) can be performed sequentially or simultaneously. UE then initiates a BFR procedure and starts a beam failure recovery request (BFRQ) transmission on a dedicated physical random-access channel (PRACH) resource corresponding to one of the identified new candidate beams. UE monitors network response to decide whether the BFR procedure is completed.

Under carrier aggregation (CA) and dual-connectivity (DC), the BFR procedure is typically supported by UE in primary cell (PCell) and primary secondary cell (PSCell), but not in secondary cells (SCells). It is necessary for UE to perform BFR in SCells so that beam failures occurred in secondary cells can also be detected and recovered. However, if UE is required to perform BFR on more than one serving cells for each frequency band, it is assumed that UE performance cannot be guaranteed. In accordance with one novel aspect, UE performs BFR procedure on one serving cell for one FR band across FR1 and FR2, where the serving cell is an active serving cell, including both primary cell and secondary cells. Specifically, for secondary serving cell BFR procedure, a sharing factor K is introduced for the evaluation period of BFD/CBD on SCells, when multiple SCells are configured to perform BFR procedure. The sharing factor K can be determined based on the number of FR bands that SCells on which UE is configured to perform BFD/CBD, excluding the FR bands with PCell and PSCell, across both FR1 and FR2 bands.

In the example of FIG. 1, a BFR procedure for both primary cell and secondary cells is depicted by 110. UE 103 is configured to operate under CA or EN-DC, with its serving base station gNB 101 and eNB 102. UE 103 then determines the number of FR bands and active serving cells on each FR bands. UE 103 also determines a sharing factor K for secondary cell BFR procedure. Finally, UE 103 performs BFR procedure on one serving cell for one FR band across FR1 and FR2, where the serving cell is an active serving cell. For primary cell and primary secondary cell, UE 103 performs BFD/CBD measurements using a predefined evaluation period. For secondary cell, UE 103 performs BFD/CBD measurements using the predefined evaluation period times the sharing factor K. In one embodiment, the sharing factor K equals to the number of FR bands that SCells on which UE is configured to perform BFD/CBD, excluding the FR bands with PCell and PSCell.

Figure 2:
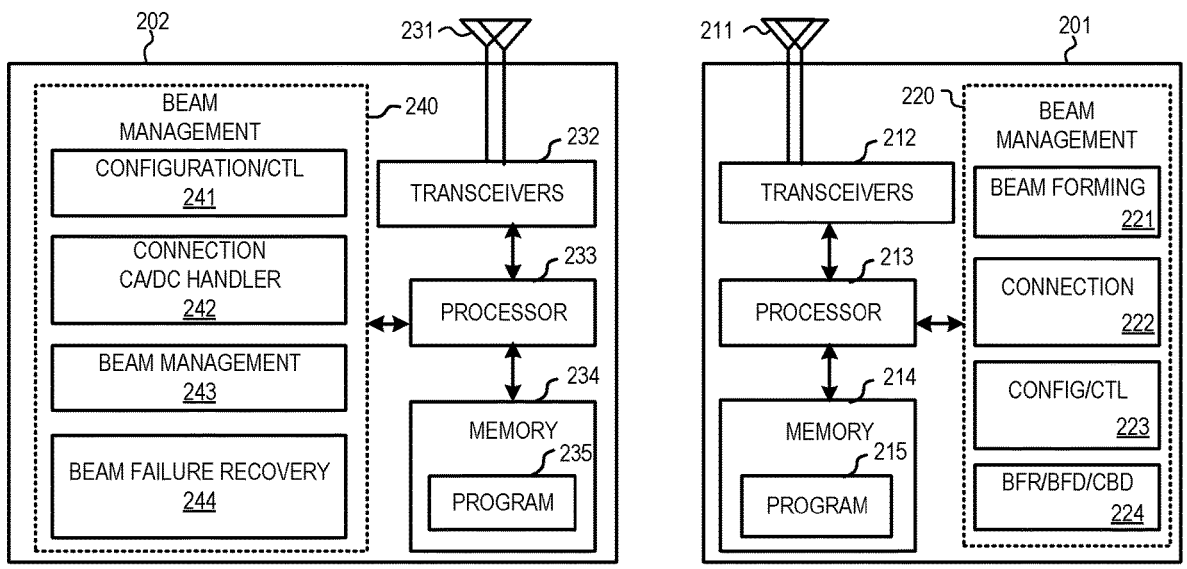
FIG. 2 is a simplified block diagram of a base station and a user equipment that carry out certain embodiments of the present invention.

FIG. 2 is a simplified block diagram of a base station 201 and a user equipment 202 that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules and circuits that carry out different tasks in accordance with embodiments of the current invention.

Similarly, UE 202 has an antenna array 231, which transmits and receives radio signals. RF transceivers module 232, coupled with the antenna array, receives RF signals from antenna array 231, converts them to baseband signals and sends them to processor 233. RF transceivers 232 also converts received baseband signals from processor 233, converts them to RF signals, and sends out to antenna array 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules and circuits can be implemented and configured by hardware, firmware, software, and any combination thereof. For example, BS 201 comprises a beam management module 220, which further comprises a beam forming circuit 221, a connection handling module 222, a configuration and control circuit 223, and a BFR handling module 224. Beamforming circuit 221 may belong to part of the RF chain, which applies various beamforming weights to multiple antenna elements of antenna 211 and thereby forming various beams. Connection handling module 222 establishes connections for different serving cells under carrier aggregation and dual connectivity. Config and control circuit 223 provides configuration and control information to UEs. BFR handling module 224 performs physical layer radio link monitor, measurements, and beam failure recovery functionality.

Similarly, UE 202 comprises a beam management module 240, which further comprises a beam management module 240, which further comprises a beam forming circuit 241, a connection handling module 242, a configuration and control circuit 243, and a BFR handling module 244. Beamforming circuit 241 may belong to part of the RF chain, which applies various beamforming weights to multiple antenna elements of antenna 231 and thereby forming various beams. Connection handling module 242 establishes connections for different serving cells under carrier aggregation and dual connectivity. Config and control circuit 243 receives configuration and control information from its serving BS. BFR handling module 244 performs physical layer radio link monitor, measurements, and beam failure recovery functionality in both PCell, PSCell, and SCells with a sharing factor to reduce UE complexity. In one example, the config/control circuit determines the sharing factor K based on the number of frequency bands that the UE is configured for BFR procedure, excluding the FR bands with PCell and PSCell. The BFR handling module performs BFD/CBD measurements for PCell and PSCell using a predefined evaluation period, and performs BFD/CBD measurements for SCells using a predefined evaluation period times the sharing factor K.

Figures 3, 4:
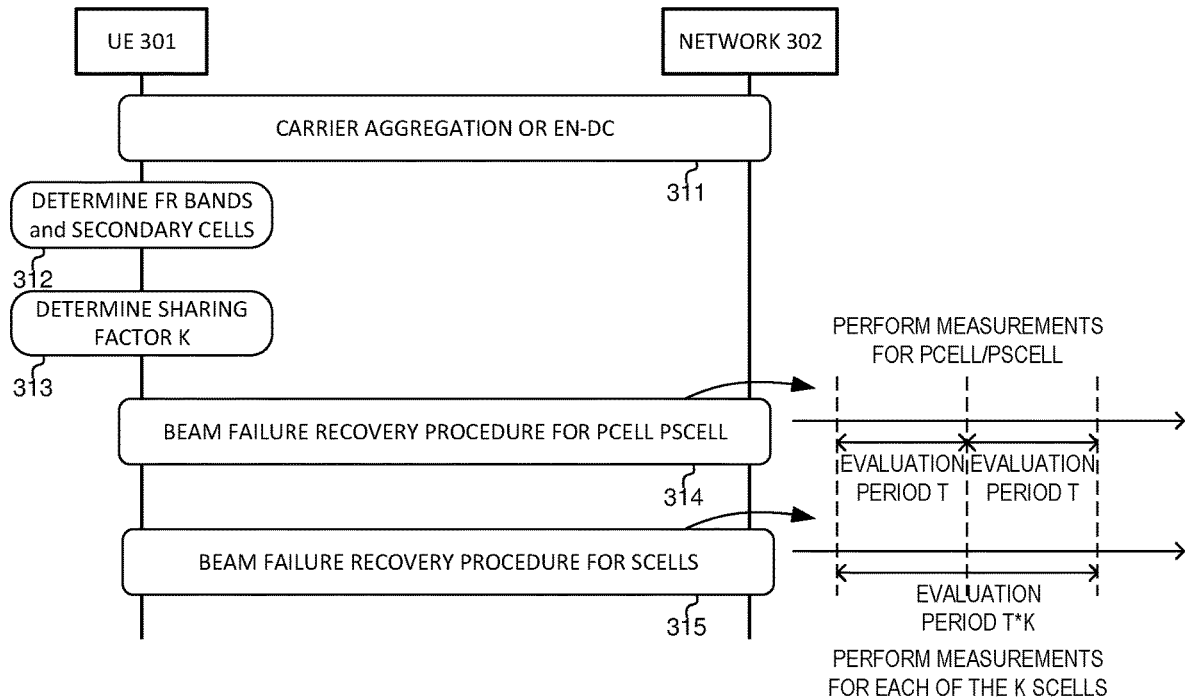
FIG. 3 illustrates a sequence flow between a UE and a network supporting a beam failure recovery (BFR) procedure for both primary cell and secondary cells with a sharing factor.
FIG. 4 illustrates examples of an evaluation period of a BFD measurement procedure for both primary cell and secondary cells with a sharing factor.

FIG. 3 illustrates a sequence flow between a UE and a network supporting a beam failure recovery (BFR) procedure for both primary cell and secondary cells with a sharing factor. In step 311, UE 301 is configured to operate in multiple FR bands (e.g., LTE/NR FR1 and FR2) under carrier aggregation (CA) or dual-connectivity (DC). Under CA, UE 301 establishes multiple connections in a primary cell (PCell) and one or more secondary cells (SCells). Under DC, UE 301 establishes multiple connections in a primary cell (PCell), a primary secondary cell (PSCell), and one or more secondary cells (SCells). A BFR procedure is designed to handle the rare case beam tracking issue, e.g., when feedback rate for beam management and beam training may not be frequent enough. BFR includes both beam failure detection (BFD) and candidate beam identification (CBD), which involves periodic RF signal measurements in different serving cells with a predefined evaluation period.

In one advantageous aspect, UE 301 performs BFR procedure on one serving cell for one frequency band across FR1 and FR2, where the serving cell is an active serving cell, including both primary cell and secondary cells. It is sufficient to perform BFR procedure on one serving cell on the same FR band, since UE assumes the same downlink spatial domain transmission filter for the serving cells on the same FR band. For a given time point, it can observe that if a beam failure has been detected on one serving cell, then very likely the beam failure would also occur on other serving cells on the same band, since the same beamforming will be applied. Therefore, it is not necessary to simultaneously perform BFR procedure on multiple serving cells on the same FR band.

Accordingly, in step 312, UE 301 determines active serving cells including PCell, PSCell, and selected SCells for BFD/CBD measurements. Note that PCell and PSCell are always active UE 301 always performs BFR for PCell and PSCell. On the other hand, SCells are first configured via RRC signaling and then activated via MAC CE. Multiple SCells may be configured in the same FR band. For BFD/CBD measurements purpose, a selected SCell is a secondary cell that is configured and activated. In addition, for FR band with PCell or PSCell, SCell configured in the same FR band is not selected for BFD/CBD measurements. For FR band configured with multiple SCells, only one SCell is selected for BFD/CBD measurement.

For secondary serving cell BFR procedure, a sharing factor K is introduced for the evaluation period of BFD/CBD on SCells to reduce UE complexity and to improve UE performance. In step 313, UE 301 determines the sharing factor K for SCell BFR, when multiple SCells are configured to perform BFR procedure. If multiple SCells are selected for BFD/CBD measurements, then the multiple selected SCells shares the same extended evaluation period, e.g., a predefined evaluation period times K for periodic BFD/CBD measurements. The sharing factor K is thus equal to the number of selected SCells. The sharing factor can be determined based on the number of FR bands that SCells on which UE is configured to perform BFD/CBD, excluding the FR bands with PCell and PSCell, across both FR1 and FR2 bands. In step 314, UE 301 performs periodic BFD/CBD measurements for PCell and PSCell, using a predefined evaluation period T. In step 315, UE 301 performs periodic BFD/CBD measurements for one or more selected SCells, sharing the same extended evaluation period T*K. For example, if K=2, then UE 301 performs BFD/CBD measurements for PCell and for PSCell with a periodicity of T, and UE 301 also performs BFD/CBD measurements for two selected SCells with a periodicity of 2T.

FIG. 4 illustrates examples of an evaluation period of a BFD measurement procedure for both primary cell and secondary cells with a sharing factor. Similar concept is applicable for CBD measurement procedure. As depicted by table 400, the evaluation period changes based on various configuration: no DRX, DRX with DRX cycle<=320 ms, and DRX with DRX cycle>320 ms. Under no DRX operation, the evaluation period for BFD measurements $T_{BFD}$ is Max ([50], Ceil(5*P)*$T_{SSB}$) in PCell, and the evaluation period for BFD measurements in SCells is $T_{BFD}*K_{BFD}$. Under DRX operation with DRX cycle<=320 ms operation, the evaluation period for BFD measurements $T_{BFD}$ is Max ([50], Ceil(7.5*P)*Max ($T_{DRX}$, $T_{SSB}$)) in PCell, and the evaluation period for BFD measurements in SCells is $T_{BFD}*K_{BFD}$. Under DRX operation with DRX cycle>320 ms operation, the evaluation period for BFD measurements $T_{BFD}$ is Ceil(5*P)*$T_{DRX}$ in PCell, and the evaluation period for BFD measurements in SCells is $T_{BFD}*K_{BFD}$. Note that $T_{SSB}$ is the periodicity of synchronization signal block (SSB) in the serving cell, and $T_{DRX}$ is the DRX cycle length.

FIG. 5 illustrates different scenarios of determining a sharing factor K for a BFR procedure with secondary cells in FR2 bands in accordance with one novel aspect. In the scenarios of FIG. 5, as depicted by table 500, SCells are configured across different FR2 bands. Suppose the evaluation period for primary cell BFD/CBD measurements is $T_{BFR}$ Under EN-DC configuration, in scenario #1, FR1 has PCell, FR2-band #21 has PSCell and SCell #2, FR2-band #22 has SCell #1, and FR2-band #23 has no activated SCells. SCell #1 is a selected secondary cell for BFR, SCell #2 is not selected because it is in the same FR2-band #21 that includes PSCell. As a result, K=1 because there is only one secondary cell SCell #1 for BFD/CBD measurements with the same evaluation period of $T_{BFR}$. In scenario #2, FR1 has PCell, FR2-band #21 has PSCell and SCell #3, FR2-band #22 has SCell #1 and SCell #2, and FR2-band #23 has no activated SCells. SCell #1 is a selected secondary cell for BFR, SCell #2 is not selected because there can be only one secondary cell in the same FR2-band #22. SCell #3 is also not selected because it is in the same FR2-band #21 that includes PSCell. As a result, K=1 because there is only one secondary cell SCell #1 for BFR measurements. In scenario #3, FR1 has PCell, FR2-band #21 has PSCell, FR2-band #22 has SCell #1, and FR2-band #23 has SCell #2. SCell #1 and SCell #2 are two secondary cells both selected for BFR measurements. As a result, K=2 because there are two secondary cells SCell #1 and SCell #2 selected for BFD/CBD measurements, sharing the same evaluation period of $2*T_{BFR}$.

Under FR2 CA configuration, a UE is configured with multiple cells in FR2. In scenario #4, FR2-band #21 has PCell, FR2-band #22 has SCell, FR2-band #23 has no activated SCells. SCell is the only selected secondary cell and K=1. In scenario #5, FR2-band #21 has PCell, FR2-band #22 has SCell #1, FR2 band #23 has SCell #2. SCell #1 and SCell #2 both are selected secondary cells and K=2. Under FR1-FR2 CA configuration, a UE is configured with multiple cells across FR1 and FR2. In scenario #6, FR1 has PCell, FR2-band #21 has SCell #1, FR2-band #22 has SCell #2 and SCell #3, FR2-band #23 has no activated SCells. SCell #1 and SCell #2 are two selected secondary cells and K=2. SCell #3 is not selected because FR2-band #22 can only have one selected secondary cell for BFR measurements. In scenario #7, FR1 has PCell, FR2-band #21 has SCell #1, FR2 band-#22 has SCell #2, FR2-band #23 has SCell #3. SCell #1, SCell #2 and SCell #3 are three selected secondary cells and K=3 for BFD/CBD measurements, sharing the same evaluation period of $3*T_{BFR}$.

FIG. 6 illustrates different scenarios of determining a sharing factor K for a BFR procedure with secondary cells in both FR1 and FR2 in accordance with one novel aspect. In the scenarios of FIG. 6, as depicted by table 600, SCells are configured across different FR1 and FR2 bands. Suppose the evaluation period for primary cell BFD/CBD measurements is $T_{BFR}$. Under EN-DC configuration, in scenario #1, FR1-band #11 has PCell, FR1-band #21 has SCell #1, FR2-band #21 has PSCell, and FR2-band #22 has no activated SCells. SCell #1 is a selected secondary cell for BFR. As a result, K=1 because there is only one secondary cell SCell #1 for BFD/CBD measurements. In scenario #2, FR1-band #11 has PCell, FR1-band #21 has SCell #1, FR2-band #21 has PSCell, and FR2-band #22 has SCell #2. SCell #1 and SCell #2 both are selected secondary cells for BFD/CBD measurements. As a result, K=2 for secondary cell BFD/CBD measurements with an evaluation period of $2*T_{BFR}$. In scenario #3, FR1-band #11 has PCell, FR1-band#21 has SCell #1, FR2-band #21 has PSCell and SCell #2, and FR2-band #22 has SCell #3. SCell #1 is a selected secondary cell for BFR, SCell #3 is also a selected secondary cell for BFR. SCell #2 is not a selected secondary cell because it is in the same FR2-band #21 that includes PSCell. As a result, K=2 for secondary cell BFD/CBD measurements with the evaluation period of $2*T_{BFR}$.

Under FR1-FR2 CA configuration, a UE is configured with multiple cells across FR1 and FR2. In scenario #4, FR1-band #11 has PCell, FR1-band #21 has SCell #1, FR2-band #21 has SCell #2 and SCell #3, and FR2-band #22 has no activated SCells. SCell #1 is a selected secondary cell for BFR. SCell #2 is a selected cell but SCell #3 is not selected because there is only one selected secondary cell in the same FR2-band #21. As a result, K=2 for BFD/CBD measurements. In scenario #5, FR1-band #11 has PCell, FR1-band #21 has SCell #1, FR2-band #21 has SCell #2, and FR2-band #22 has SCell #3. SCell #1, SCell #2, and SCell #3 are all selected secondary cells for BFR. As a result, K=3 for secondary cell BFD/CBD measurements with the evaluation period of $3*T_{BFR}$.

Figure 7:
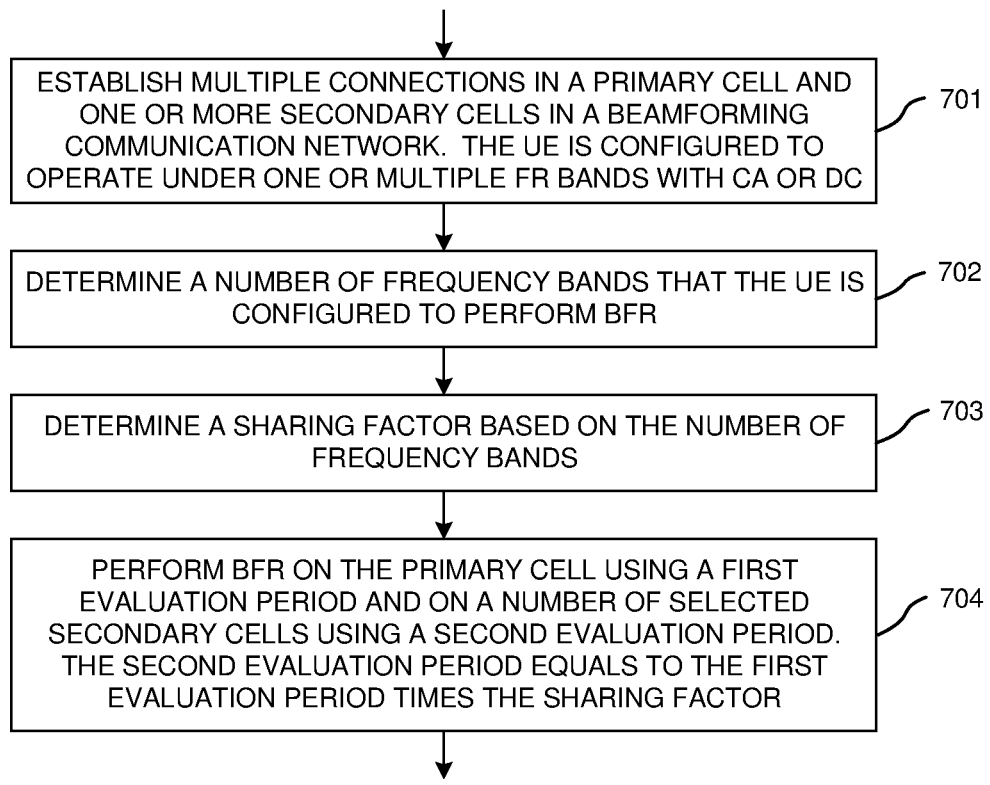
FIG. 7 is a flow chart of a method of beam failure recovery procedure for secondary cells in a beamforming system in accordance with one novel aspect.

FIG. 7 is a flow chart of a method of beam failure recovery procedure for secondary cells in a beamforming system in accordance with one novel aspect. In step 701, a UE establishes multiple connections in a primary cell and one or more secondary cells in a beamforming communication network. The UE is configured to operate under one or multiple frequency bands with carrier aggregation or dual connectivity. In step 702, the UE determines a number of frequency bands that the UE is configured to perform beam failure recovery (BFR). In step 703, the UE determines a sharing factor based on the number of frequency bands. In step 704, the UE performs BFR on the primary cell using a first evaluation period and on a number of selected secondary cells using a second evaluation period. The second evaluation period equals to the first evaluation period times the sharing factor. In one embodiment, the sharing factor is equal to the number of the selected secondary cells, which is also equal to the number of frequency bands excluding any frequency band with the primary cell or a primary secondary cell under carrier aggregation or dual connectivity.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing multiple connections in a primary cell and one or more secondary cells by a user equipment (UE) in a beamforming communication network, wherein the UE is configured to operate under one or multiple frequency bands with carrier aggregation or dual connectivity;
   determining a number of frequency bands that the UE is configured to perform beam failure recovery (BFR);
   determining a sharing factor based on the number of frequency bands; and performing BFR on the primary cell using a first evaluation period and on at least one of the one or more secondary cells using a second evaluation period, wherein the second evaluation period equals to the first evaluation period times the sharing factor.

2. The method of claim 1, wherein a BFR procedure comprises a beam failure detection (BFD) procedure and a candidate beam detection (CBD) procedure having a measurement periodicity.

3. The method of claim 2, wherein the UE performs measurements in the primary cell using the first evaluation period as the measurement periodicity for BFD and CBD.

4. The method of claim 2, wherein the UE performs measurements in each of the number of selected secondary cells using the second evaluation period as the measurement periodicity for BFD and CBD.

5. The method of claim 1, wherein the UE is configured to select up to one active serving cell to perform BFR for each frequency band.

6. The method of claim 5, wherein the sharing factor equals to the number of frequency bands, excluding a frequency band with the primary cell under carrier aggregation.

7. The method of claim 5, wherein the sharing factor equals to the number of frequency bands, excluding a frequency band with the primary cell and excluding a frequency band with a primary secondary cell under dual connectivity.

8. The method of claim 5, wherein a secondary cell in a frequency band is not selected for BFR if the primary cell is in the same frequency band.

9. The method of claim 5, wherein a secondary cell in a frequency band is not selected for BFR if a primary secondary cell is in the same frequency band.

10. The method of claim 5, wherein only one secondary cell in a frequency band is selected for BFR if multiple secondary cells are in the same frequency band.

11. A User Equipment (UE), comprising:
a connection handling module that establishes multiple connections in a primary cell and one or more secondary cells by a user equipment (UE) in a beamforming communication network, wherein the UE is configured to operate under one or multiple frequency bands with carrier aggregation or dual connectivity;
a control module that determines a number of frequency bands that the UE is configured to perform beam failure recovery (BFR), wherein the UE determines a sharing factor based on the number of frequency bands; and
a BFR handling module that performs BFR on the primary cell using a first evaluation period and on at least one of the one or more secondary cells using a second evaluation period, wherein the second evaluation period equals to the first evaluation period times the sharing factor.

12. The UE of claim 11, wherein a BFR procedure comprises a beam failure detection (BFD) procedure and a candidate beam detection (CBD) procedure having a measurement periodicity.

13. The UE of claim 12, wherein the UE performs measurements in the primary cell using the first evaluation period as the measurement periodicity for BFD and CBD.

14. The UE of claim 12, wherein the UE performs measurements in each of the number of selected secondary cells using the second evaluation period as the measurement periodicity for BFD and CBD.

15. The UE of claim 11, wherein the UE is configured to select up to one active serving cell to perform BFR for each frequency band.

16. The UE of claim 15, wherein the sharing factor equals to the number of frequency bands, excluding a frequency band with the primary cell under carrier aggregation.

17. The UE of claim 15, wherein the sharing factor equals to the number of frequency bands, excluding a frequency band with the primary cell and excluding a frequency band with a primary secondary cell under dual connectivity.

18. The UE of claim 15, wherein a secondary cell in a frequency band is not selected for BFR if the primary cell is in the same frequency band.

19. The UE of claim 15, wherein a secondary cell in a frequency band is not selected for BFR if a primary secondary cell is in the same frequency band.

20. The UE of claim 15, wherein only one secondary cell in a frequency band is selected for BFR if multiple secondary cells are in the same frequency band.

* * * * *